3,126,383
METHOD FOR RECOVERING ALKYLAMINE-FREE ETHYLENEDIAMINE AND PIPERAZINE
Justin F. Cooper, Austin, Tex., assignor to Jefferson Chemical Company, Inc., Houston, Tex., a corporation of Delaware
No Drawing. Filed Nov. 3, 1958, Ser. No. 771,219
3 Claims. (Cl. 260—268)

The present invention relates to ethylenediamine and piperazine and, in particular, to a method for recovering ethylenediamine and piperazine substantially free of jointly produced alkylamine impurities.

In the manufacture of ethylenediamine and piperazine by way of the catalytic amination of materials, such as monoethanolamine and ethylene glycol, there is produced in addition to ethylenediamine, piperazine and water, substantial quantities of impurities, such as the alkylamines from the group consisting of N-methylethylenediamine, N-ethylethylenediamine, 1-methylpiperazine and 1-ethyl-piperazine. Separation of ethylenediamine and piperazine from the alkylamine impurities cannot be accomplished according to ordinary methods of distillation because the boiling points of the alkylamines are too close to or lie between the boiling points of ethylenediamine and piperazine. Superfraction procedures can be used to recover ethylenediamine and piperazine free of the impurities but such procedures are very expensive and time consuming. A relatively simple and inexpensive method has now been discovered, however, whereby ethylenediamine and piperazine may be recovered substantially free of alkylamine impurities.

In accordance with this invention, the reaction product or a part thereof from the amination reaction of monoethanolamine or ethylene glycol to produce ethylenediamine and piperazine, which consists of ethylenediamine, piperazine, water and the alkylamine impurities from the group consisting of N-methylethylenediamine, N-ethylethylenediamine, 1-methylpiperazine and 1-ethylpiperazine, is subjected to steam distillation to effect the removal of a first fraction consisting of water, ethylenediamine and substantially all of the alkylamines, and thereafter separating a second fraction overhead consisting essentially of ethylenediamine and water leaving a third fraction consisting of piperazine and some ethylenediamine and water as bottoms in the fractionating zone. The separated fractions in particular the ethylenediamine and water fraction and the piperazine and ethylenediamine fraction both free of alkylamine impurities may be subjected to further treatment to isolate substantially pure ethylenediamine and piperazine respectively.

The reaction for the production of ethylenediamine and piperazine resulting in a crude mixture containing ethylenediamine, piperazine, water and the alkylamines from the group consisting of N-methylethylenediamine, N-ethylethylenediamine, 1-methylpiperazine and 1-ethylpiperazine may be conducted by reacting monoethanolamine or ethylene glycol with ammonia at an elevated temperature and at a superatmospheric pressure in the presence of hydrogen and a hydrogenation catalyst. This reaction may be conducted at a temperature from about 150–400° C., preferably in the range of 200–275° F. The pressure may range from about 30 up to about 400 atmospheres.

The molar amount of ammonia employed in this reaction should be in excess over the molar amount of monoethanolamine or ethylene glycol employed. Normally there will be in the order of about 2 or 3 mols of ammonia per mol of the companion reactant. Hydrogen is essential for this reaction, and, as a rule, there should be at least 10 and preferably between 20 and 200 atmospheres of hydrogen pressure employed.

The reaction is conducted in the presence of a hydrogenation catalyst. While a large number of hydrogenation catalysts may be employed, the preferred catalyst comprises one or more of the materials selected from the group consisting of the metals and oxides of copper, nickel, and cobalt. Despite the suitability of the oxides, however, it is preferred practice to employ the catalyst in a more reduced form. The preferred catalyst may also be employed with a promoter from the group consisting of chromium oxide, manganese oxide, molybdenum oxide and thorium oxide. A specific preferred catalyst composition consists of 75% nickel oxide, 22% copper oxide and 3% chromium oxide prior to reduction.

Two general methods of operation may be employed in practicing the process of this invention. According to the first method of treatment, the total crude reaction product, consisting of substantial amounts of ethylenediamine and piperazine together with water and the alkylamine impurities from the group consisting of N-methylethylenediamine, N-ethylethylenediamine, 1-methylpiperazine and 1-ethylpiperazine may be introduced into a suitable fractionating zone. Steam is also introduced into this fractionating zone generally at a point below the surface of the boiling mixture. Steam distillation is then continued until susbtantially all of the alkylamine impurities are taken off overhead in a first fraction also consisting of ethylenediamine and water leaving in the column substantial proportions of the feed ethylenediamine, piperazine and water free of the alkylamine impurities.

The foregoing steam distillation may be continued to recover a second fraction overhead. This second fraction consists predominantly of ethylenediamine with some water and traces of piperazine leaving as bottoms a mixture consisting predominantly of piperazine with minor amounts of ethylenediamine and water. The bottoms mixture may be subjected to simple distillation to separate and recover substantially pure piperazine.

In a preferred method of operation, the crude piperazine reaction product, consisting of ethylenediamine, piperazine, water and the aforementioned alkylamine impurities, is subjected to simple distillation to distill overhead a fraction consisting of ethylenediamine, piperazine, water and the alkylamine impurities, leaving as bottoms a fraction comprising a substantial proportion of piperazine. Substantially pure piperazine may be recovered from the bottoms fraction by simple distillation. The overhead fraction containing all of the original components but having a substantially reduced proportion of piperazine is the fraction subjected to steam distillation in this preferred method to separate ethylenediamine and piperazine free of the alkylamine impurities. This fraction, accordingly, is introduced into a suitable fractionating zone while steam is passed into said zone preferably at a point below the surface of the boiling mixture. The fractionating column is preferably operated at substantially atmospheric pressure with a pot temperature ranging from about 119–124° C. while the head temperature ranges from about 100 to about 120° C. A reflux is employed to improve the efficiency of the separation. Generally, this reflux should be at least 1:1 and may range up to 10 or 20:1 or higher, depending on the efficiency of the fractionating column. For practical reasons, the ratio of 5:1 gives satisfactory results with a column having 8 theoretical plates. Under the foregoing conditions, a fraction consisting of some ethylenediamine, the alkylamine impurities and water is first distilled overhead to remove the alkylamines from the mixture. A second fraction consisting of ethylenediamine and water and a minor amount of piperazine is then distilled overhead leaving a bottoms fraction consisting of piperazine, water and some ethylenediamine. This may be separated by ordinary distillation to give a good recovery of the piperazine free of alkylamine impurities which may then be added to the piperazine bottoms from the initial separation.

Either of the foregoing methods of operation may be adapted to a continuous separation process. Thus, the preferred method may be conducted continuously by passing the total crude reaction product into a simple distillation zone to separate overhead a fraction consisting of ethylenediamine, piperazine, water and the alkylamine impurities leaving a bottoms fraction consisting of a substantial proportion of piperazine which may be rendered substantially pure in a second simple distillation. Meanwhile, the overhead fraction having a substantially reduced proportion of piperazine may be continuously introduced into a separate distillation zone and subjected to steam distillation. Under these conditions a first fraction consisting of ethylenediamine, the alkylamine impurities and some water is continuously removed overhead leaving the ethylenediamine in admixture with piperazine and water in the distillation zone. This admixture may be continuously removed and introduced into a second distillation zone concurrently with steam to effect a second steam distillation. In this second steam distillation a second fraction consisting of ethylenediamine water and a minor amount of piperazine is continuously recovered overhead. This fraction may be subjected to further treatment to effect the recovery of substantially pure ethylenediamine. The bottoms from the second steam distillation consisting of piperazine, water and a minor amount of ethylenediamine may also be subjected to further distillation to effect the recovery overhead of substantially pure piperazine which may be combined with the product piperazine recovered following fractionation of the total crude reaction product.

The following example illustrates the practice of this invention:

EXAMPLE I

An impure ethylenediamine and piperazine mixture representative of an overhead fraction from the crude reaction product produced in the reaction of monoethanolamine and ammonia to form ethylenediamine and piperazine consisting of water, 1183 pounds of ethylenediamine, 7.8 pounds of N-methylethylenediamine, 2.4 pounds of N-ethylethylene diamine, 14.4 pounds of 1-methylpiperazine, 3.7 pounds of 1-ethylpiperazine and 38.9 pounds of piperazine was introduced into the still pot of a 12 foot by 6 inch diameter fractionating column packed with ½ inch Intalox saddles. The still pot was operated at an initial temperature of 119° C. and the column head had an initial temperature of 100° C. under atmospheric pressure. Steam was continuously passed into the mixture boiling in the still pot while a 5:1 reflux ratio was maintained during the entire distillation. The compositions in weight percent and the temperatures recorded for the various cuts taken during this separation are given in Table 1 below. The abbreviations for the various materials separated and identified together with their sample boiling points are explained at the foot of Table 1.

Table 1

STEAM-STRIPPING OF ALKYLAMINE IMPURITIES FROM CRUDE ETHYLENEDIAMINE

| Cut. No. | Head, ° C. | Pot, ° C. | Reflux Ratio | Weight, Lbs. | H₂O | Analysis of Cuts by Vapor Chromatography, Wt. percent | | | | | |
|---|---|---|---|---|---|---|---|---|---|---|---|
| | | | | | | E.D.A. 1 | M.E.D.A. 2 | E.E.D.A. 3 | M. PIP 4 | E. PIP 5 | PIP. 6 |
| 1 | 100 | 119 | 5/1 | 131.0 | 92.7 | 6.5 | — | — | 0.8 | — | — |
| 2 | 100 | 119 | 5/1 | 116.0 | 91.7 | 7.1 | — | — | 1.2 | — | — |
| 3 | 100–113 | 119.5 | 5/1 | 118.0 | 81.0 | 9.0 | 3.5 | 0.6 | 5.1 | 0.8 | — |
| 4 | 113–115 | 119.5 | 5/1 | 61.0 | 51.8 | 35.0 | 6.0 | 0.6 | 5.8 | 0.8 | — |
| 5 | 115–119 | 121.5 | 5/1 | 53.0 | 11.5 | 77.0 | — | 2.5 | 4.6 | 4.2 | — |
| 6 | 119.5 | 123 | 5/1 | 1,230.0 | 16.1 | 82.8 | — | — | — | — | 1.0 |
| 7 | 120 | 124 | 5/1 | 43.0 | 5.1 | 82.8 | — | — | — | — | 12.0 |
| Residue | | | | 63.0 | 3.1 | 62.9 | — | — | — | — | 34.0 |

(—) indicates less than 0.1 wt. percent.
1. Ethylenediamine, boiling point, 117° C.
2. N-methylethylenediamine, boiling point, 115° C.
3. N-ethylethylenediamine, boiling point, 129° C.
4. 1-methylpiperazine, boiling point, 135° C.
5. 1-ethylpiperazine, boiling point, 156° C.
6. Piperazine, boiling point, 145° C.

It will be seen from the foregoing example that the alkylamine impurities including N-methylethylenediamine, N-ethylethylenediamine, 1-methylpiperazine and 1-ethylpiperazine which are present in the crude ethylenediamine-piperazine reaction product may be substantially completely removed by steam distillation at temperatures ranging up to 119° C. under atmospheric pressure, thereby permitting the recovery of a fraction boiling in the range of 119.5° C.–120° C. at atmospheric pressure consisting essentially of ethylenediamine and water.

Obviously, many modifications and variations of the invention as hereinbefore set forth may be made without departing from the spirit and scope thereof and therefore only such limitations should be imposed as are indicated in the appended claims.

I claim:

1. In a method for the preparation of piperazine by the catalytic reductive amination of a feed material selected from the group consisting of monoethanolamine and ethylene glycol, and wherein a liquid reaction product is formed containing piperazine, ethylenediamine, water and N-alkylamine by-products comprising a mixture of N-methylethylenediamine, N-ethylethylenediamine, N-methylpiperazine and N-ethylpiperazine, the improvement which comprises fractionally distilling said reaction product in a first distillation zone into a first distillate fraction containing ethylenediamine, said N-alkylamine by-products and a reduced amount of piperazine and a first bottoms fraction consisting essentially of piperazine, fractionally distilling said first distillate fraction in a second distillation zone at a head temperature within the range of about 100° to 120° C. in the presence of an amount of water sufficient to steam strip said N-alkylamine impurities from the piperazine in said first distillate fraction and to thereby provide a second distillate fraction comprising ethylenediamine, said N-alkylamine by-products and water and a second bottoms fraction comprising piperazine, water and ethylenediamine, and fractionally distilling said second bottoms fraction to obtain purified piperazine.

2. A method as in claim 1 wherein piperazine is recovered from the second bottoms fraction by distilling said second bottoms fraction in a third distillation zone to provide a third distillate fraction consisting essentially of water and ethylenediamine and a third bottoms fraction consisting essentially of piperazine.

3. In a method for the preparation of piperazine by the catalytic reductive amination of a feed material selected from the group consisting of monoethanolamine and ethylene glycol, and wherein a liquid reaction product is formed containing piperazine, ethylenediamine, water and N-alkylamine by-products comprising a mixture of N-methylethylenediamine, N-ethylethylenediamine, N-methylpiperazine and N-ethylpiperazine, the improvement which comprises the steps of distilling said reaction product in a first distillation zone at a head temperature within the range of about 100° to about 120° C. in the presence of an amount of water sufficient to steam strip said N-alkylamine impurities overhead, recovering a first distillate fraction comprising a mixture of said N-alkylamine by-products, ethylenediamine and water, and a first bottoms fraction, distilling said first bottoms fraction in the presence of water to obtain a second distillate containing ethylenediamine, water and a minor amount of piperazine and a second bottoms fraction containing piperazine, water and a minor amount of ethylenediamine, distilling said second distillate fraction to recover substantially pure ethylenediamine therefrom and distilling said second bottoms fraction to recover substantially pure piperazine therefrom.

References Cited in the file of this patent
UNITED STATES PATENTS 2,267,686    Kyrides _____ Dec. 23, 1941

FOREIGN PATENTS 762,625    Great Britain _____ Nov. 28, 1956

OTHER REFERENCES

Morton: Laboratory Technique in Organic Chemistry, pages 124–125, (First Edition) 1938.